Patented Mar. 9, 1948

2,437,284

UNITED STATES PATENT OFFICE 2,437,284

ARTIFICIAL RUBBER FROM VINYL RESIN, PHENOL-ALDEHYDE RESIN, AND PLASTICIZER

Benjamin W. Watson, Trenton, N. J.

No Drawing. Application November 22, 1943,
Serial No. 511,345

8 Claims. (Cl. 260—34)

This invention relates to the art of preparing synthetic rubber-like compositions, and particularly to compositions including polymerized vinyl halides.

In the art it is known that many thermoplastic resins can be softened by the addition of suitable plasticizers to form synthetic compositions as soft as resilient natural rubber. However, this addition of softening agents to thermoplastic resins greatly reduces the tensile strength of the resultant mixture. This excess reduction in tensile strength is also common to plasticized polymers and copolymers of vinyl halides as prepared according to prior art.

The polyvinyl chlorides used shall be of higher molecular weights, i. e. their average melting points shall be above 115° C.

It is the primary object of this invention to produce a soft plasticized polyvinyl halide composition that has greatly increased tensile strength as contrasted with plasticized polyvinyl halide resins of the same hardness range heretofore known in the art.

Another object of the invention is to provide a soft synthetic composition that exhibits a stress-strain relationship that is more characteristic of the physical properties of soft resilient natural rubber than of a softened plastic material.

A further object is to provide a resilient composition prepared by blending a highly plasticized thermosetting resin with a thermoplastic resin.

A further important object is to provide a resilient product comprising plasticized phenol-aldehyde resin in combination with plasticized polyvinyl chloride, wherein the phenol-aldehyde resin acts as a sealer and tends to prevent exuding and drying of the plasticizer at the surface.

A further object is to provide a synthetic plasticized composition of the polyvinyl halide type having unusual high temperature stability permitting higher temperature molding and extruding operations, greatly improved calendering properties, improved resistance of plasticizer to water extraction by emulsification, decreased permeability to inert gases and liquids, and having improved bonding properties with inert surfaces.

One of the principal values of the polyvinyl chlorides blended with the phenol-aldehyde resin preparation in accordance with my invention, is improved bonding to cotton and the like, as is necessary in coated or calendered fabrics and cords.

Other advantages of this invention will be apparent from the following description thereof.

In accordance with this invention, a higher molecular weight polyvinyl halide, preferably polyvinyl chloride, is blended with a plasticizer and a thermosetting resin such as a phenol-formaldehyde resin or a phenol-furfuraldehyde resin. It was found convenient to blend plasticized polyvinyl chloride and plasticized phenol-aldehyde resins. It is important that the polyvinyl chloride employed in these blends be of higher molecular weight, an average melting point above 125° C. being most suitable in order to promote a proper blend with the plasticizer and phenol-aldehyde resin.

The plasticized phenol-aldehyde resin is employed as a modifier for the plasticized polyvinyl chloride. The proportion of the phenol to aldehyde in the phenolic resin used is such that they will condense ultimately to form either high melting point thermoplastic or true thermosetting resins, e. g. one containing approximately one molecule of phenol per molecule of aldehyde. The phenol-aldehyde content of the plasticized phenol-aldehyde polyvinyl chloride blend should be limited between one-half of one percent to fifteen percent by weight of the blended mix, exclusive of fillers. The best results are obtained where the phenol-aldehyde content ranges between four and nine percent by weight of the said blended mix, exclusive of fillers. Optimum tensile strength and characteristic rubber-like properties are obtained with approximately seven percent by weight of phenol-aldehyde resin in the plasticized phenol-aldehyde polyvinyl chloride blended mix, exclusive of fillers.

This invention contemplates the mixing of different synthetic resins with polyvinyl chloride to be employed in the preparation of rubber substitutes. In the mixing of different synthetic resins, it is of value to note that resins of higher average molecular weights are more often miscible with each other than the same resins of lower average molecular weights. This principle applies in this invention as evidenced by the fact that polyvinyl chlorides of an average melting point of less than about 125° C. are not sufficiently compatible with the phenol-aldehyde, even with the employment of excellent blending mediums.

If desired, fillers may be added to the resinous blend. Other conventional modifiers may be employed if compatible with the resinous mix.

The following examples will serve to illustrate this invention:

Example I

A plasticized phenol formaldehyde resin may be prepared as in the following illustrative example:

| | Parts by weight |
|---|---|
| Phenol | 100 |
| 40% by wt. formaldehyde solution | 110 |
| Phosphoric acid | 2 |
| Total | 212 |

These ingredients may be heated under reflux at about 95° C. for two or three hours. Then add either 29 parts by wt., additional of formaldehyde 40% solution, or add 50 parts by wt. of furfural. After heating the entire mass for about three hours additional, or not less than one hour additional, at 100° C., 100 parts by weight of plasticizer is added to the mass. The plasticizer used may be of those having strong solvent value upon the fusible phenolic intermediate resin such as the dialkyl phthalates, dialkyl oxalates, ethylene glycol dibutyrates (also diacetates or dipropionates), dimethoxyethyl or diethoxyethyl adipates, tributyl phosphate, triphenyl or tricresyl phosphate, glycerol tripropionate or glycerol tributyrate, glycerol triacetate, etc. The dialkyl esters employed should contain not less than ten or more than twenty-one carbon atoms per molecule. The heat may be continued several more hours under reflux, then drain off the water that has separated, and continue heating about four hours or until the phenol-aldehyde-plasticizer mixture has risen to 135° C. The material is now of a gelatinous consistency suitable for use in the mixer. Other methods of manufacture may be employed, such as pressure and elevated temperature to reduce the time requirements. Also, two or three hundred additional parts of plasticizer could have been added before the finishing heat of the above mixture had exceeded 120° C. if it were desired to maintain the phenol-aldehyde-plasticizer blend as a liquid that could be poured. For a good result, I have observed that the plasticizer combine must create the best compatibility of the blend, and then good strength will result, otherwise, the mixture of the phenol-aldehyde material makes a poorer result than if it had not been used. The following mix will illustrate combinations resulting in a blend on a two roll mixer (rolls preheated to 90° C.):

| | Parts by weight |
|---|---|
| Polyvinyl chlorides, M. P. of 150° C. | 55 |
| Somewhat undercured phenol-formaldehyde resin prepared as above, dispersed into 6 pts. of dibutyl phthalate, which is included below as plasticizer | 6 |
| Alkyd resin and ricinoleic acid (castor oil mixed with about 25% by wt., phthalic anhydride and heated at 145° C. for about four days) | 4 |
| Glycerol tripropionate, or glycerol tributyrate | 4 |
| Dibutyl phthalate inclusive of the 6 pts. in the phenol-aldehyde preparation employed | 29 |
| Dioctyl phthalate | 2 |
| Total | 100 |

Although not necessary, if desired, about 10 parts by weight of channel black, or about 5 parts channel black and 10 parts of soft-black may be milled into the above mass to increase hardness and rubberlike stress-strain relationship. The foregoing material with the carbon black milled into it has a hardness of 65–70 durometer (Shore A), an ultimate tensile strength of approximately 2000 p. s. i. after molding for ¾ hr. at 148° C. and at 200 p. s. i. pressure. It is particularly notable that the stress-strain curve of this material is "concave upward" with stress plotted as ordinates. If the phenol-aldehyde material is not used, a polyvinyl chloride-dibutyl phthalate blend of corresponding hardness value has an ultimate tensile strength below 1500 p. s. i. and the stress-strain curve of the material is "concave downward" with stress plotted as ordinates.

Example II

Mix 80 parts by weight (grams) of phenol with 86 parts by weight of 40% formaldehyde solution in water with 2 parts by weight of ammonia. Heat mixture in a digester until water separates from the "oil of phenol" and remove the water. Add 88 parts by weight dibutyl phthalate and 44 parts by weight furfural and continue heating the mixture until its temperature rises to 135° C. at a pressure of one atmosphere. This highly plasticized condensation resin may be blended in a Banbury mixer or on a two roll rubber mixer with a plasticized polyvinyl chloride to bring about the following combined formulation:

| | Parts by weight |
|---|---|
| Copolymer of vinyl chloride and vinyl acetate containing 93 to 95 percent vinyl chloride and having average molecular weight of 24,000 | 41.2 |
| Copolymer of vinyl chloride and vinyl acetate having 88.5 to 90.5 per cent vinyl chloride and average molecular weight of 16,000 | 9.1 |
| Phenol formaldehyde-furfural resin | 7.5 |
| Phthalated glycerol ricinoleate | 2.8 |
| Glycerol phthalate | 2.8 |
| Dioctyl phthalate | 2.8 |
| Dibutyl phthalate | 33.8 |
| Subtotal | 100.0 |
| Channel black filler | 3.3 |
| Lamp black filler | 4.7 |
| Total by weight | 108.0 |

This composition was found to have a hardness of 55–60 durometer (Shore "A"), an ultimate tensile strength of 1400 p. s. i. and exhibited the "concave upward" stress-strain characteristic with stress plotted as ordinates.

Example III

Mix 90 grams of phenol with 86 grams of 35% formaldehyde solution in water with 0.25 gram of concentrated hydrochloric acid. Heat mixture in a digester until water separates from the "oil of phenol" and remove the water. Add 80 grams diethyl phthalate and 10 grams paraformaldehyde (or 28.5 grams 35% formaldehyde solution if preferred) and continue heating the mixture until its temperature rises to 135° C. at a pressure of one atmosphere. This highly plasticized condensation resin may be blended in a Banbury mixer or on a two roll rubber mixer with a plasticized polyvinyl chloride to bring about the following combined formulation:

| | Parts |
|---|---|
| Resin, polymer of vinyl chloride only, high molecular wt., polyvinyl chloride | 45.0 |
| Resin, polymer of vinyl acetate only, medium high molecular weight, polyvinyl acetate | 5.0 |
| Phenol formaldehyde | 6.0 |
| Phthalated glycerol ricinoleate | 2.0 |
| Glycerol tributyrate | 2.0 |
| Diamyl phthalate | 5.0 |
| Diethyl phthalate | 6.0 |
| Dibutyl phthalate | 24.0 |
| Diethoxyethyl adipate | 5.0 |
| Total by weight | 100.0 |

This composition with 6 parts channel black added has physical properties similar to those of formulation under "Example II."

*Example IV*

| | Parts by weight |
|---|---|
| Unplasticized high molecular weight polyvinyl chloride | 52 |
| Plasticized fusible phenol formaldehyde resin of which 6 parts by weight is the phenol formaldehyde resin | 12 |
| Plasticizer | 36 |
| Filler material such as gas black, lamp black, diatomaceous earth, kaolin, and the like (optional) | 0–15 |

Blend the above ingredients on a two roll rubber mixer or Banbury type mixer.

The above examples are only illustrative of the invention. The term phenol preferably includes monohydric compounds having the benzene ring nucleus, such as phenol, cresol, xylenol and B-naphthol. Dihydric and trihydric phenols such as resorcinol and pyrogallol may be employed but are not recommended for best results. In general, I desire to include all phenols which enter into the Adolf von Baeyer reaction with some aldehydes or ketones to form phenolic resins. It is preferred to employ $C_6H_5OH$. If an alkyl radicle is substituted for hydrogen in the benzene ring it is preferred that the lower members of the series $C_nH_{2n}$ be employed, such as methyl.

Either or both formaldehyde or furfural is preferred in the preparation of the phenol-aldehyde resin. Other aldehydes or combinations of aldehydes and ketones may be employed which enter into the Baeyer reaction with a phenol to form a phenol-aldehyde or phenol-aldehyde-ketone resin. The most useful aldehydes are formaldehyde, benzaldehyde, furfuraldehyde and acrylic-aldehyde. In combination with formaldehyde or furfural, acetone or methylethyl ketone may be employed.

Plasticized cyclohexanone-formaldehyde resin is an attractive addition to plasticized polyvinyl chlorides for improving bonding characteristics.

Plasticizers such as tricresyl phosphate, dioctyl phthalate and etc., do not plasticize polyvinyl chloride to bring about as resilient a material as do some of the less oily compounds having a lower molecular weight and of higher solvent power, such as dibutyl phthalate. Those heavy plasticizers such as tricresyl phosphate, etc., exude an oily film from polyvinyl chloride, which is undesirable for many uses. However, a plasticizer, such as dibutyl phthalate is a strong solvent for many paint and lacquer resins and resinous compounds containing these strong solvent plasticizers would soften, mar or pick up paints or lacquers on furniture and the like, upon contact therewith for any appreciable time. I have found that the phenol-aldehyde blend with these stronger solvent plasticizers practically eliminates their solvent power for paint and lacquer films. Therefore, it is possible under this invention to employ plasticizers of high solvent power for phenol-aldehyde resins and polyvinyl chloride resins and which have a lower molecular weight and lower viscosities than plasticizers now employed in the art.

Although molding operations may cure the phenol-aldehyde resin content of the plasticizer-polyvinyl chloride-phenol-aldehyde blend, it has been observed that this blend may be remolded or remilled directly without any special reclaiming processes being required.

In the examples set forth, the highly plasticized phenol-aldehyde resin acts as a sealer when blended with the polyvinyl chloride resins to preclude or lessen the tendency for the vinyl resins to dry up at the surface and harden with the passage of time. The term "highly plasticized" when applied to the phenol-aldehyde resins means that it contains sufficient proportion of plasticizer to prevent the phenolaldehyde resin from being too hard to be blended into the polyvinyl chloride resins.

Plasticized polyvinyl chlorides modified in accordance with this invention exhibit improved heat resistance with respect to decomposition and thermoplasticity.

The compositions prepared in accordance with this invention retain the excellent molding and extrusion characteristics of plasticized polyvinyl chlorides and have properties suitable for many articles now made of soft natural rubber, butadiene polymers, and butyl rubber.

The highly plasticized phenol-aldehyde resin, as a sealer, works well with plasticized polymerizates of vinyl chloride and copolymers of vinyl chloride. The sealer blends extremely well with polyvinyl acetate resins. The sealer is also useful for blending with other thermoplastic resinous compositions with which it is compatible.

Various modifications of the present invention will be apparent to those skilled in the art. In its broadest aspects the invention contemplates the employment of a plasticized phenol-aldehyde resin as a sealer for blending with a plasticized or unplasticized thermoplastic resinous composition.

What I claim is:

1. The process of preparing a resilient rubber-substitute composition which comprises heating to a reaction temperature of about 135° C. until a gelatinous consistency is obtained a thermosetting partially cured phenol-aldehyde resin and a liquid plasticizer which has a strong solvent action on said resin, and mixing the resulting highly plasticized phenol-aldehyde resin with a polyvinyl resin having an average melting point in excess of 125° C., said polyvinyl resin being selected from the group consisting of polyvinyl chloride and copolymers of vinyl chloride and vinyl acetate, the phenol-aldehyde content of the mixture being between ½% and 15% by weight of the mixture, exclusive of fillers.

2. A resilient rubber-substitute composition prepared by the process defined in claim 1.

3. A resilient rubber-substitute composition set forth in claim 2 in which the phenol-aldehyde resin is phenol-formaldehyde-furfural resin.

4. A resilient rubber-substitute composition set

5. A resilient rubber-substitute composition set forth in claim 2 in which the phenol-aldehyde resin is phenol-acetone-formaldehyde resin.

5. A resilient rubber-substitute composition set forth in claim 2 in which the phenol-aldehyde resin is phenol-formaldehyde resin.

6. A resilient rubber-substitute composition set forth in claim 2 in which the plasticizer is dibutyl phthalate.

7. A resilient rubber-substitute composition set forth in claim 2 in which the plasticizer is di-ethoxyethyl adipate.

8. A resilient rubber-substitute composition set forth in claim 2 in which the plasticizer is tricresyl phosphate.

BENJAMIN W. WATSON.

REFERENCES CITED

The following references are of record in the file of this patent:

UNITED STATES PATENTS

| Number | Name | Date |
|---|---|---|
| 2,310,889 | Becker | Feb. 9, 1943 |
| 2,270,662 | Raney | Jan. 20, 1942 |
| 2,057,690 | Moss | Oct. 20, 1936 |
| 1,592,082 | Conover | July 13, 1926 |
| 2,006,345 | Carswell | July 2, 1935 |
| 2,336,792 | Langkammerer | Dec. 14, 1943 |

FOREIGN PATENTS

| Number | Country | Date |
|---|---|---|
| 147,067 | Switzerland | July 16, 1931 |

OTHER REFERENCES

"Vinylite Copolymer Resins for Surface Coatings," pp. 16 and 17, pub. 1942 by Carbide and Carbon Chem. Corp.

"Handbook of Plastics" by Simonds and Ellis, pp. 336 and 337, pub. 1943 by D. Van Nostrand Co., N. Y.